(12) United States Patent
Bo et al.

(10) Patent No.: US 11,367,898 B2
(45) Date of Patent: Jun. 21, 2022

(54) ELECTROLYTE AND LITHIUM ION BATTERY INCLUDING THE SAME

(71) Applicant: Ningde Amperex Technology Limited, Fujian (CN)

(72) Inventors: Xiangkun Bo, Fujian (CN); Jieyan Sun, Fujian (CN); Chao Tang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 16/175,889

(22) Filed: Oct. 31, 2018

(65) Prior Publication Data

US 2020/0099100 A1     Mar. 26, 2020

(30) Foreign Application Priority Data

Sep. 21, 2018 (CN) .......................... 201811104264.6

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01); *H01M 2300/0091* (2013.01)

(58) Field of Classification Search
CPC ...................................... H01M 10/0566–0569
See application file for complete search history.

(56) References Cited

U.S. PATENT DOCUMENTS

| | | | | |
|---|---|---|---|---|
| RE44,705 E * | 1/2014 | Ihara | ..................... | H01M 6/164 429/322 |
| 10,461,366 B1 * | 10/2019 | Anderson | ............. | H01M 4/625 |
| 2017/0200976 A1 * | 7/2017 | Nakazawa | ............ | H01M 4/386 |
| 2017/0317383 A1 * | 11/2017 | Kawabe | ................ | H01M 4/364 |
| 2017/0338471 A1 | 11/2017 | Zheng et al. | | |
| 2018/0048020 A1 * | 2/2018 | Zou | ....................... | H01M 4/364 |
| 2019/0148776 A1 * | 5/2019 | Cho | ................. | H01M 10/0525 429/332 |

FOREIGN PATENT DOCUMENTS

| | | |
|---|---|---|
| CN | 101110477 | 1/2008 |
| CN | 101197455 | 6/2008 |
| CN | 104900916 | 9/2015 |
| CN | 105098237 | 11/2015 |
| CN | 105140564 | 12/2015 |
| CN | 105355975 | 2/2016 |
| CN | 105680088 | 6/2016 |
| CN | 106450499 | 2/2017 |
| CN | 108232300 | 6/2018 |
| CN | 108242567 | 7/2018 |
| CN | 108258312 | 7/2018 |
| CN | 109216769 | 1/2019 |
| CN | 109687025 | 4/2019 |
| CN | 109524716 | 9/2019 |
| CN | 110265717 | 9/2019 |
| CN | 110998957 | 4/2020 |
| CN | 111033865 | 4/2020 |
| CN | 111525191 | 8/2020 |
| JP | 2017168347 | 9/2017 |
| WO | WO-2017213441 A1 * | 12/2017 ........ H01M 10/0567 |

OTHER PUBLICATIONS

Bo, Xiangkun; Office Action for Chinese Application No. 201811104264.6, filed Mar. 27, 2020, dated Sep. 16, 2020, 10 pgs.
Bo, Xiangkun; Office Action for Chinese Application No. 201811104264.6, filed Sep. 21, 2018, dated Apr. 19, 2021, 23 pages.
Xu,Chunrui; International Search Report and Written Opinion for PCT Application No. PCT/CN2021/075012, filed Mar. 20, 2020, dated Apr. 21, 2021, 10 pages.
Xu,Chunrui; Office Action for Chinese Application No. 202010357790.4, filed Mar. 20, 2020, dated Dec. 28, 2020, 17 pages.
Xu,Chunrui; Office Action for Chinese Application No. 202010357790.4, filed Mar. 20, 2020, dated Mar. 3, 2021, 15 pages.

* cited by examiner

*Primary Examiner* — Ula C Ruddock
*Assistant Examiner* — Armindo Carvalho, Jr.
(74) *Attorney, Agent, or Firm* — Taylor English Duma LLP

(57) ABSTRACT

Embodiments of the present application provide an electrolyte and a lithium ion battery including the same. The electrolyte comprises a trinitrile compound of general formula (I),

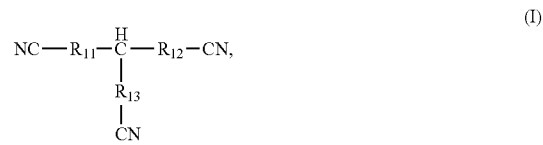

(I)

wherein $R_{11}$, $R_{12}$, and $R_{13}$ are each independently selected from alkylene groups having 0 to 8 carbon atoms, and $R_{11}$, $R_{12}$, and $R_{13}$ are not 0 simultaneously; and fluorosulfonyl silane acetate. The present application improves the cycle performance, rate performance and floating charge performance of lithium ion batteries by using the trinitrile compound and fluorosulfonyl silane acetate in combination.

17 Claims, No Drawings

ELECTROLYTE AND LITHIUM ION BATTERY INCLUDING THE SAME

CROSS-REFERENCE TO RELATED APPLICATION

This application claims priority to and benefits of Chinese Patent Application Serial No. 201811104264.6, filed with the China National Intellectual Property Administration on Sep. 21, 2018, and the entire content of which is incorporated herein by reference.

FIELD OF THE APPLICATION

The present application relate to the field of battery, in particular, to an electrolyte and a lithium ion battery including the same.

BACKGROUND OF THE APPLICATION

Lithium-ion batteries are widely used in mobile devices such as mobile phones, notebook computers, and drones, and in vehicles such as electric vehicles. Large rate discharge and low temperature discharge capability are necessary for the lithium ion batteries to extend its application. There is an increasing demand for batteries with excellent cycle performance and rate performance in the market. At the same time, people are accustomed to charging electronic devices at night. However, if the battery is not unplugged immediately after being fully charged, the battery will be continuously charged and will be in a state of high charging for a long time. This phenomenon is referred to as floating charge. The floating charge performance of the battery directly affects the problem of flatulence, ultra-thickness, and capacity attenuation of the battery.

Therefore, it is indeed necessary to provide an electrolyte which improves the cycle performance, rate performance and floating charge performance of a lithium ion battery in order to better meet the market demand.

SUMMARY OF THE APPLICATION

The present application improves the cycle performance, rate performance and floating charge performance of lithium ion batteries by using the nitrile compound and fluorosulfonyl silane acetate in combination.

Embodiments of the present application provide an electrolyte comprising a trinitrile compound of general formula (I),

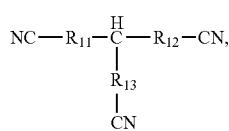

wherein $R_{11}$, $R_{12}$, and $R_{13}$ are each independently selected from alkylene groups having 0 to 8 carbon atoms, and $R_{11}$, $R_{12}$, and $R_{13}$ are not 0 simultaneously; and fluorosulfonyl silane acetate.

In the above electrolyte, wherein the trinitrile compound is selected from one or more of 1,3,6-hexanetrizonitrile, 1,2,6-hexanetricarbonitrile, 1,3,5-pentatrionitrile, 1,2,3-propanetricarbonitrile.

In the above electrolyte, wherein the fluorosulfonyl silane acetate is a compound of general formula (II):

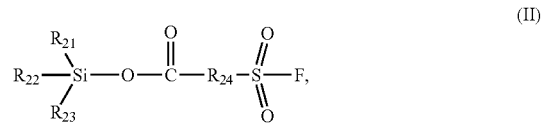

wherein $R_{21}$, $R_{22}$, $R_{23}$ and $R_{24}$ are independently an alkyl group having 1 to 10 carbon atoms, a fluoroalkyl group having 1 to 10 carbon atoms, an alkoxy group having 1 to 10 carbon atoms or a fluoroalkoxy group having 1 to 10 carbon atoms.

In the above electrolyte, wherein the fluorosulfonyl silane acetate is selected from one or more of trimethylsilyl difluoro(fluorosulfonyl) acetate, triethylsilyl difluoro(fluorosulfonyl) acetate, fluoromethyl trimethylsilyl difluoro(fluorosulfonyl) acetate, difluoromethyl trimethylsilyl difluoro(fluorosulfonyl) acetate.

In the above electrolyte, wherein the content of the fluorosulfonyl silane acetate is 0.1 wt % to 10 wt % and the content of the trinitrile compound is 0.1 wt % to 5 wt %, based on the total weight of the electrolyte.

In the above electrolyte, further comprising a dinitrile compound, wherein the dinitrile compound includes at least one of general formula (III) and general formula (IV),

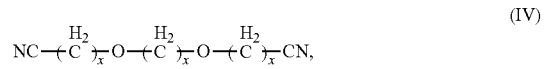

in general formula (III) and general formula (IV), x is a positive integer from 1 to 8.

In the above electrolyte, wherein the dinitrile compound is selected from one or more of butanedinitrile, pentanedinitrile, adiponitrile, heptanedinitrile, ethylene glycol bis(propionitrile) ether, and the content of the dinitrile compound is 0.1 wt % to 8 wt % based on the total weight of the electrolyte.

In the above electrolyte, wherein the electrolyte further comprises a fluoroether, wherein the fluoroether is at least one of general formula (V), $R_{31}$—O—$R_{32}$ (V); in general formula (V), $R_{31}$ and $R_{32}$ are each independently selected from at least one of fluoroalkyl groups having 1 to 5 carbon atoms.

In the above electrolyte, wherein the fluoroether is selected from one or more of 1,1,2,2-tetrafluoroethyl-1,1,2,2-tetrafluoropropyl ether, 1,1,2,2-tetrafluoroethyl-1,1,1-trifluoroethyl ether, 1,1,2,2-tetrafluoroethyl-2,2,3,3-tetrafluoropropyl ether, fluoromethyl-1,1,1,3,3,3-hexafluoroisopropyl ether, 1,1,2,2-tetrafluoroethyl ethyl ether, 1,2-bis(1,1,2,2-tetrafluoroethoxy)ethane, 1,2,2,2-tetrafluoroethyldifluoromethyl ether.

In the above electrolyte solution, wherein the content of the fluoroether is 0.1 wt % to 10 wt %, based on the total weight of the electrolyte.

In the above electrolyte solution, further comprising a cyclic ether, wherein the cyclic ether has a general formula of at least one of

wherein n is an integer from 1 to 5.

In the above electrolytic solution, wherein the cyclic ether is selected from one or more of 1,3-dioxane, 1,4-dioxane, and 1,3-dioxolane.

Embodiments of the present application also provide a lithium ion battery comprising a positive electrode, a negative electrode, a separator and the electrolyte according to embodiments of the present application.

In the above lithium ion battery, the negative electrode includes one or more of natural graphite, artificial graphite, amorphous carbon material and silicon material. Among them, the silicon material includes one or more of a silicon oxide compound, a silicon carbon compound, a silicon nitride compound, and a silicon alloy.

The present application improves the cycle performance, rate performance and floating charge performance of silicon-based lithium ion batteries by using the trinitrile compound and fluorosulfonyl silane acetate in combination.

DETAILED DESCRIPTION OF THE PREFERRED EXAMPLES

The exemplary embodiments are described in sufficient detail below, but these exemplary embodiments may be implemented in various ways and should not be construed as being limited to the embodiments set forth herein. Rather, these embodiments are provided so that the present application will be thorough and complete and the scope of the present application is fully conveyed to those skilled in the art.

The additive in the electrolyte of the present application may include a trinitrile compound, and the trinitrile compound may be a trinitrile compound of the general formula (I),

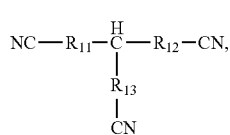

wherein $R_{11}$, $R_{12}$, and $R_{13}$ are each independently selected from alkylene groups having 0 to 8 carbon atoms, and $R_{11}$, $R_{12}$, and $R_{13}$ are not 0 simultaneously. For example, the trinitrile compound is selected from one or more of 1,3,6-hexanetrizonitrile, 1,2,6-hexanetricarbonitrile, 1,3,5-pentatrionitrile, 1,2,3-propanetricarbonitrile.

The fluorosulfonyl silane acetate is a compound represented by general formula (II):

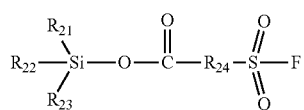

wherein $R_{21}$, $R_{22}$, $R_{23}$ and $R_{24}$ are independently an alkyl group, a fluoroalkyl group, an alkoxy group or a fluoro-alkoxy group having a carbon number of from 1 to 10. For example, the fluorosulfonyl silane acetate is selected from one or more of trimethylsilyl difluoro(fluorosulfonyl) acetate, triethylsilyl difluoro(fluorosulfonyl) acetate, fluoromethyl trimethylsilyl difluoro(fluorosulfonyl) acetate, difluoromethyl trimethylsilyl difluoro(fluorosulfonyl) acetate. More specifically, the fluorosulfonyl silane acetate is selected from one or both of the following structures:

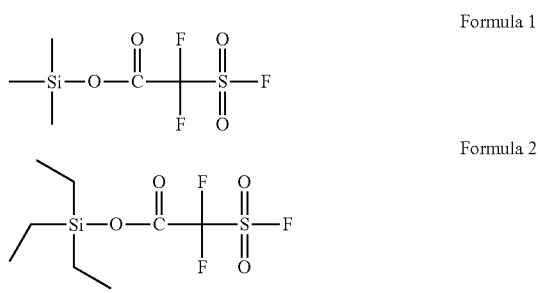

Formula 1

Formula 2

The electrolyte of the present application may further comprise a dinitrile compound, wherein the dinitrile compound includes at least one of general formula (III) and general formula (IV),

(III)

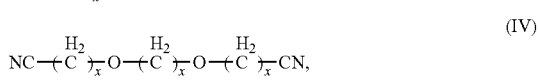

(IV)

in general formula (III) and general formula (IV), x is a positive integer from 1 to 8. For example, the nitrile compound includes one or more of butanedinitrile, pentanedinitrile, adiponitrile, heptanedinitrile, ethylene glycol bis(propionitrile) ether. The trinitrile compound and the dinitrile compound may include the following structures:

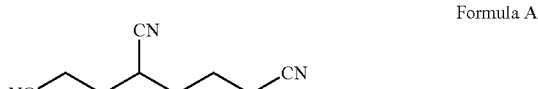

Formula A

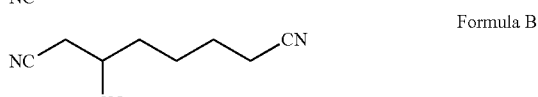

Formula B

Formula C

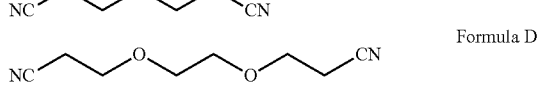

Formula D

Formula E

In the electrolyte of the present application, the fluoroether is at least one of general formula (V), $R_{31}$—O—$R_{32}$ (V); in general formula (V), $R_{31}$ and $R_{32}$ are each independently selected from one of fluoroalkyl groups having 1 to 5 carbon atoms. The fluoroether includes one or more of 1,1,2,2-tetrafluoroethyl-1,1,2,2-tetrafluoropropyl ether, 1,1,2,2-tetrafluoroethyl-1,1,1-trifluoroethyl ether, 1,1,2,2-tetrafluoroethyl-2,2,3,3-tetrafluoropropyl ether, fluoromethyl-1,1,1,3,3,3-hexafluoroisopropyl ether, 1,1,2,2-tetrafluoroethyl ethyl ether, 1,2-bis(1,1,2,2-tetrafluoroethoxy)ethane, 1,2,2,2-tetrafluoroethyldifluoromethyl ether. For example, the fluoroether includes the following structures:

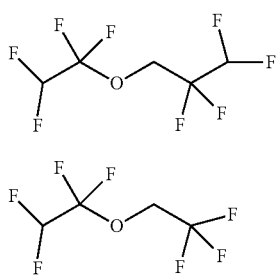

Formula x

Formula y

In the electrolyte of the present application, the cyclic ether has a general formula of at least one of

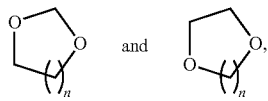

wherein n is an integer from 1 to 5. For example, the cyclic ether includes one or more of 1,3-dioxane, 1,4-dioxane, and 1,3-dioxolane. More specifically, the cyclic ether includes the following structures:

Formula a

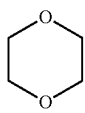

Formula b

In some embodiments of the present application, the content of the fluorosulfonyl silane acetate in the electrolyte is from 0.1 wt % to 10 wt %. When the content of the fluorosulfonyl silane acetate is too low, it is difficult to form a stable SEI on the surface of the negative electrode, and the electrode material and the electrolyte are not completely protected. When the content of the fluorosulfonyl silane acetate is too high, especially under high temperature conditions, the gas production of the electrode assembly is severe, resulting in a decrease in the rate performance.

In some embodiments of the present application, the content of the trinitrile compound in the electrolyte is from 0.1 wt % to 5 wt %, and the content of the dinitrile compound in the electrolyte is from 0.1 wt % to 8 wt %. After extensive research, it is found that the nitrile compound may stabilize the positive electrode interface and form a protective film with excellent performance. When the content of the nitrile compound is too low, the surface of the positive electrode may not be completely covered, and in the case of large rate discharge, the structure of the positive electrode may be easily destroyed; when the content of the nitrile compound is too high, the viscosity of the electrolyte is increased to affect the battery performance.

In some embodiments of the present application, the content of the cyclic ether in the electrolyte is from 0.1 wt % to 10 wt %. The cyclic ether may undergo a reduction reaction on the surface of the negative electrode to form SEI, which stabilizes the negative electrode interface. When the content of the cyclic ether is too high, the impedance of the solid electrolyte membrane formed at the interface between the positive and negative electrodes is too large to deteriorate the cycle performance; if the content of the cyclic ether is too low, a complete SEI may not be formed at the interface between the positive and negative electrodes, which is disadvantageous for the improvement of battery performance.

In some embodiments of the present application, the content of the fluoroether in the electrolyte is from 0.1 wt % to 10 wt %. When the content of the fluoroether is too high, the boiling point of the electrolyte is lowered.

The electrolyte of the present application also comprises an organic solvent, a lithium salt, and other additives. The organic solvent may include one or more of ethylene carbonate (EC), propylene carbonate (PC), and dimethyl carbonate (DEC), ethyl methyl carbonate (EMC), dimethyl carbonate (DMC), propyl propionate (PP), ethyl propionate (EP), methyl propionate (MP), propyl acetate (PA), ethyl acetate (EA). However, those skilled in the art will appreciate that the organic solvent of the present application is not limited thereto.

The lithium salt in the electrolyte of the present application may include one or more of an inorganic lithium salt and an organic lithium salt. The lithium salt may include one or more of lithium hexafluorophosphate (LiPF$_6$), lithium bis(fluorosulfonyl)imide (LiFSI), lithium bis(trifluoromethanesulfonyl)imide (LiTFSI), lithium tetrafluoroborate (LiBF$_4$), lithium methanesulfonate (LiCH$_3$SO$_3$), lithium trifluoromethanesulfonate (LiCF$_3$SO$_3$), lithium hexafluoroarsenate (LiAsF$_6$), lithium hexafluoroantimonate (LiSbF$_6$), lithium perchlorate (LiClO$_4$), Li[BF$_2$(C$_2$O$_4$)], Li[PF$_2$(C$_2$O$_4$)$_2$], Li[N(CF$_3$SO$_2$)$_2$], Li[C(CF$_3$SO$_2$)$_3$], lithium difluoro(oxalate) borate (LiODFB), lithium bis(oxalate)borate (LiBOB), lithium difluorophosphate (LiPO$_2$F$_2$). The concentration of the lithium salt is from 0.5 mol/L to 3 mol/L. However, those skilled in the art will appreciate that the lithium salt of the present application may be any other suitable lithium salt and concentration.

The electrolyte may include other additives in addition to the fluorosulfonyl silane acetate, the cyclic ether, the nitrile compound, and the fluoroether. Other additives may include one or more of vinylene carbonate (VC), fluoroethylene carbonate (FEC), propylene sulfite (PS), ethylene sulfate (DTD), 1,3-propene sultone (PST), γ-butyrolactone (GBL), tetrahydrofuran. In some embodiments of the present application, the content of the above other additives in the electrolyte is from 0.1 wt % to 10 wt %.

According to some embodiments of the present application, the electrolyte may be prepared by a conventional method, for example, mixing various materials in the electrolyte uniformly.

Embodiments of the present application also provide a lithium ion battery including the above electrolyte. The lithium ion battery further comprises a positive electrode containing a positive electrode active material, a negative electrode containing a negative electrode active material and a separator. The positive electrode active material may be selected from one or more of lithium cobalt oxide ($LiCoO_2$), lithium nickel manganese cobalt ternary material, lithium iron phosphate ($LiFePO_4$), lithium manganate ($LiMn_2O_4$), lithium nickelate ($LiNiO_2$), lithium manganites ($LiMnO_2$), lithium cobalt phosphate ($LiCoPO_4$), lithium manganese phosphate ($LiMnPO_4$) and a combination thereof. The above positive electrode active material includes a positive electrode active material which has been doped or coated in the prior art. The negative electrode active material may include at least one of a silicon material, carbon, and graphite. For example, it may be selected from one or more of natural graphite, artificial graphite, mesocarbon microbeads (referred to as MCMB), hard carbon, soft carbon, silicon, silicon oxide, silicon carbon compound, silicon nitride compound, silicon alloy. In some embodiments of the present application, the mass ratio of silicon to carbon is 1:9 to 5:5, the median diameter D50 is 10 μm to 50 μm, and the specific surface area is 3 $m^2/g$ to 10 $m^2/g$. In the silicon alloy, the alloying element is selected from at least one of Fe, Co, Sb, Bi, Pb, Ni, Cu, Zn, Ge, In, Sn, and Ti.

In order to prevent a short circuit, a separator is usually provided between the positive electrode and the negative electrode. For example, a separator including a substrate layer and a surface treatment layer; the substrate layer is a nonwoven fabric, a film or a composite film having a porous structure, and the material of the substrate layer is selected from at least one of polyethylene, polypropylene, polyethylene terephthalate, and polyimide. Specifically, a polypropylene porous film, a polyethylene porous film, a polypropylene nonwoven fabric, a polyethylene nonwoven fabric, or a polypropylene-polyethylene-polypropylene porous composite film, may be used. The surface treatment layer is arranged on at least one surface of the substrate layer, and the surface treatment layer may be a polymer layer or an inorganic layer or may be a layer formed by mixing a polymer and an inorganic substance. However, those skilled in the art will appreciate that the positive electrode active material, the negative electrode active material, and the separator of the present application may be other suitable materials.

The preparation of a lithium ion battery will be described below with reference to specific examples. The lithium ion batteries in the following examples and comparative examples are all prepared by the following methods, which differ in the kind and amount of additives. Those skilled in the art will understand that the preparation method described in the present application is merely an example, and any other suitable preparation methods are within the scope the present application.

The preparation process of the lithium ion battery of the examples and comparative examples of the present application is as follows:

Comparative Example 1

(1) Preparation of Electrolyte

In a dry argon atmosphere glove box, ethylene carbonate (EC), propylene carbonate (PC), dimethyl carbonate (DEC) and propyl propionate (PP) are mixed in a mass ratio of EC:PC:DEC:PP=10:15:35:20, followed by adding fluorosulfonyl silane acetate represented by Formula 1 with a mass fraction of 2 wt %, then after dissolving and stirring well, the lithium salt $LiPF_6$ is added to obtain an electrolyte after mixing uniformly. Among them, the concentration of $LiPF_6$ is 1.05 mol/L.

(2) Preparation of the Positive Electrode

A positive electrode active material lithium cobalt oxide ($LiCoO_2$), conductive carbon black (conductive agent Super P), polyvinylidene fluoride (CMC), and N-methylpyrrolidone (NMP) are mixed at a weight ratio of 97.9:1.2:0.5:0.4, then stir uniformly to obtain a slurry having a solid content of 72%. The slurry is uniformly coated on a positive current collector of aluminum foil, dried at 80° C., and then subjected to cold pressing, cutting, and slitting, and then dried under vacuum at 85° C. for 4 h, to obtain a positive electrode.

(3) Preparation of the Negative Electrode

A silicon carbon compound with a silicon to carbon mass ratio of 2:8 and a conductive agent acetylene black, a binder styrene butadiene rubber (SBR), a thickener sodium carboxymethyl cellulose (CMC) are mixed at a weight ratio of 95:2:2:1, and a deionized water is added to obtain a negative electrode slurry having a solid content of 49% under the action of a vacuum mixer; the negative electrode slurry is uniformly coated on the negative current collector of copper foil; the copper foil is dried at 80° C., and then subjected to cold pressing, cutting, and slitting, and then dried under vacuum at 120° C. for 12 h, to obtain a negative electrode.

(4) Preparation of Separator

A polyethylene (PE) separator with a thickness of 16 μm is used.

(5) Preparation of Lithium Ion Battery

The positive electrode, the separator and the negative electrode are stacked in order so that the separator is in a role of isolation between the positive electrode and the negative electrode, and then are wound to place in an outer packaging foil, and then subjected to processes such as top encapsulation, side encapsulation, liquid injection, forming (charged to 3.3V with a constant current of 0.02 C, and then to 3.8V with a constant current of 0.1 C), and finally subjected to an initial detection for the performance of the battery, to obtain a soft package lithium ion battery.

Comparative Example 2

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a trinitrile represented by formula A with a mass fraction of 2 wt % is added in the electrolyte.

Comparative Example 3

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a dinitrile represented by formula D with a mass fraction of 0.5 wt % are added in the electrolyte.

Comparative Example 4

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a dinitrile represented by formula D with a mass fraction of 0.01 wt % are added in the electrolyte.

Comparative Example 5

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1.

Comparative Example 6

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a trinitrile represented by formula A with a mass fraction of 2 wt % is added in the electrolyte.

Example 1

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a trinitrile represented by formula A with a mass fraction of 2 wt % are added in the electrolyte.

Example 2

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a trinitrile represented by formula A with a mass fraction of 5 wt % are added in the electrolyte.

Example 3

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a trinitrile represented by formula A with a mass fraction of 1 wt % are added in the electrolyte.

Example 4

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a trinitrile represented by formula B with a mass fraction of 1 wt % are added in the electrolyte.

Example 5

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a trinitrile represented by formula B with a mass fraction of 2 wt % are added in the electrolyte.

Example 6

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a trinitrile represented by formula C with a mass fraction of 2 wt % are added in the electrolyte.

Example 7

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 2 with a mass fraction of 2 wt % and a trinitrile represented by formula A with a mass fraction of 0.3 wt % are added in the electrolyte.

Example 8

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 1 wt % and a trinitrile represented by formula A with a mass fraction of 2 wt % are added in the electrolyte.

Example 9

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 0.5 wt % and a trinitrile represented by formula A with a mass fraction of 2 wt % are added in the electrolyte.

Example 10

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt % and a trinitrile represented by formula A with a mass fraction of 0.5 wt % are added in the electrolyte.

Example 11

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt % and a trinitrile represented by formula A with a mass fraction of 3 wt % are added in the electrolyte.

Example 12

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 3 wt % and a trinitrile represented by formula A with a mass fraction of 2 wt % are added in the electrolyte.

Example 13

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 5 wt % and a trinitrile represented by formula A with a mass fraction of 2 wt % are added in the electrolyte.

Example 14

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt % and a trinitrile represented by formula A with a mass fraction of 6 wt % are added in the electrolyte.

Example 15

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 10 wt % and a trinitrile represented by formula A with a mass fraction of 2 wt % are added in the electrolyte.

Example 16

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 1.5 wt % and a dinitrile represented by formula D with a mass fraction of 0.5 wt % are added in the electrolyte.

Example 17

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 1 wt % and a dinitrile represented by formula D with a mass fraction of 1 wt % are added in the electrolyte.

Example 18

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dinitrile represented by formula D with a mass fraction of 0.5 wt % are added in the electrolyte.

Example 19

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 1.5 wt % and a dinitrile represented by formula E with a mass fraction of 0.5 wt % are added in the electrolyte.

Example 20

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 1 wt % and a dinitrile represented by formula E with a mass fraction of 1 wt % are added in the electrolyte.

Example 21

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dinitrile represented by formula E with a mass fraction of 0.5 wt % are added in the electrolyte.

Example 22

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt %, a dinitrile represented by formula D with a mass fraction of 0.5 wt % and a dinitrile represented by formula E with a mass fraction of 0.5 wt % are added in the electrolyte.

Example 23

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dinitrile represented by formula D with a mass fraction of 2 wt % are added in the electrolyte.

Example 24

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dinitrile represented by formula D with a mass fraction of 3 wt % are added in the electrolyte.

Example 25

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dinitrile represented by formula D with a mass fraction of 5 wt % are added in the electrolyte.

Example 26

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dinitrile represented by formula D with a mass fraction of 8 wt % are added in the electrolyte.

Example 27

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula a with a mass fraction of 1 wt % are added in the electrolyte.

Example 28

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula b with a mass fraction of 1 wt % are added in the electrolyte.

Example 29

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula a with a mass fraction of 0.5 wt % are added in the electrolyte.

Example 30

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula a with a mass fraction of 2 wt % are added in the electrolyte.

Example 31

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula a with a mass fraction of 5 wt % are added in the electrolyte.

Example 32

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula b with a mass fraction of 0.5 wt % are added in the electrolyte.

Example 33

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula b with a mass fraction of 2 wt % are added in the electrolyte.

Example 34

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula b with a mass fraction of 5 wt % are added in the electrolyte.

Example 35

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula a with a mass fraction of 6 wt % are added in the electrolyte.

Example 36

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula a with a mass fraction of 10 wt % are added in the electrolyte.

Example 37

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula x with a mass fraction of 5 wt % are added in the electrolyte.

Example 38

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula y with a mass fraction of 5 wt % are added in the electrolyte.

Example 39

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula x with a mass fraction of 1 wt % are added in the electrolyte.

Example 40

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2

Example 41

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula x with a mass fraction of 2.5 wt % are added in the electrolyte.

Example 42

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula x with a mass fraction of 3 wt % are added in the electrolyte.

Example 43

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula x with a mass fraction of 7 wt % are added in the electrolyte.

Example 44

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula x with a mass fraction of 10 wt % are added in the electrolyte.

Example 45

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula y with a mass fraction of 1% are added in the electrolyte.

Example 46

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula y with a mass fraction of 2 wt % are added in the electrolyte.

Example 47

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 2 with a mass fraction of 2 wt %, a trinitrile represented by formula A with a mass fraction of 2 wt % and a fluoroether represented by formula y with a mass fraction of 2 wt % are added in the electrolyte.

Example 48

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula x with a mass fraction of 11 wt % are added in the electrolyte.

Example 49

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt %, a dinitrile represented by formula D with a mass fraction of 0.5 wt % and a dioxane represented by formula a with a mass fraction of 1 wt % are added in the electrolyte.

Example 50

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt %, a dinitrile represented by formula D with a mass fraction of 0.5 wt % and a fluoroether represented by formula x with a mass fraction of 3 wt % are added in the electrolyte.

Example 51

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt %, a dioxane represented by formula a with a mass fraction of 1 wt % and a fluoroether represented by formula x with a mass fraction of 3 wt % are added in the electrolyte.

Example 52

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt %, a dinitrile represented by formula D with a mass fraction of 0.5 wt %, a dioxane represented by formula a with a mass fraction of 1 wt % and a fluoroether represented by formula x with a mass fraction of 3 wt % are added in the electrolyte.

Example 53

The electrolyte and lithium ion battery are prepared in the same manner as in Comparative Example 1, except that in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 2 with a mass fraction of 2 wt %, a trinitrile represented by formula A with a mass fraction of 2 wt %, a dinitrile represented by formula D with a mass fraction of 0.5 wt % and a dioxane represented by formula a with a mass fraction of 1 wt % are added in the electrolyte.

Example 54

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt % and a trinitrile represented by formula A with a mass fraction of 2 wt % are added in the electrolyte.

Example 55

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a dinitrile represented by formula D with a mass fraction of 0.5 wt % are added in the electrolyte.

Example 56

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a dioxane represented by formula a with a mass fraction of 1 wt % are added in the electrolyte.

Example 57

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a trinitrile represented by formula A with a mass fraction of 2 wt % and a fluoroether represented by formula x with a mass fraction of 3 wt % are added in the electrolyte.

Example 58

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt $LiPF_6$ of 1.05 mol/L, a fluorosulfonyl silane acetate represented by formula 1 with a mass fraction of 2 wt %, a dinitrile represented by formula D with a mass fraction of 0.5 wt % and a dioxane represented by formula a with a mass fraction of 1 wt % are added in the electrolyte.

Example 59

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt %, a dinitrile represented by formula D with a mass fraction of 0.5 wt % and a fluoroether represented by formula x with a mass fraction of 3 wt % are added in the electrolyte.

Example 60

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt %, a dioxane represented by formula a with a mass fraction of 1 wt % and a fluoroether represented by formula x with a mass fraction of 3 wt % are added in the electrolyte.

Example 61

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 1 with a mass fraction of 2 wt %, a trinitrile represented by formula A with a mass fraction of 2 wt %, a dinitrile represented by formula D with a mass fraction of 0.5 wt %, a dioxane represented by formula a with a mass fraction of 1 wt % and a fluoroether represented by formula x with a mass fraction of 3 wt % are added in the electrolyte.

Example 62

The electrolyte and lithium ion battery are prepared in the same manner as in Comparative Example 1, except that the negative electrode is obtained by mixing a graphite, a conductive agent acetylene black, a binder styrene-butadiene rubber (SBR), and a thickener sodium carboxymethylcellulose (CMC) at a weight ratio of 95:2:2:1, and in addition to ethylene carbonate (EC), propylene carbonate (PC), diethyl carbonate (DEC), and propyl propionate (PP) that are in a mass ratio of 10:15:35:20 and the lithium salt LiPF$_6$ of 1.05 mol/L, a fluorosulfonyl silane acetate represented by formula 2 with a mass fraction of 2 wt %, a trinitrile represented by formula A with a mass fraction of 2 wt %, a dinitrile represented by formula D with a mass fraction of 0.5 wt %, a dioxane represented by formula a with a mass fraction of 1 wt % and a fluoroether represented by formula x with a mass fraction of 3 wt % are added in the electrolyte.

Thereafter, the cycle performance test is performed on the lithium ion batteries of the examples and the comparative examples, and the specific test methods are as follows:

the lithium-ion battery is placed in a 25° C. incubator and allowed to stand for 30 minutes to keep the lithium ion battery at a constant temperature. The battery is charged to 4.4 V with a constant current of 0.5 C and charged to a current of 0.05 C at a constant voltage and allowed to stand for 5 minutes, and then discharged to 3.0 V with a constant current of 0.5 C and allowed to stand for 5 minutes. The above is a charge and discharge cycle. When the capacity for the first discharge is 100%, the charge and discharge cycle is repeated until the discharge capacity is attenuated to 80%, then the test is stopped, and the number of cycles is recorded as an index for evaluating the cycle performance of the lithium ion battery.

At the same time, the cycle performance at 45° C. of the lithium ion battery is tested. The test method is the same as the test for the cycle performance at 25° C.

In addition, the floating charge performance test is performed on the lithium ion batteries of the examples and the comparative examples, and the specific test methods are as follows:

the lithium-ion battery is placed in a 45° C. incubator and allowed to stand for 30 minutes to keep the lithium ion battery at a constant temperature. The battery is charged to 3 V with a constant current of 0.5 C and allowed to stand for 5 minutes, and then discharged to 4.4 V with a constant current of 0.5 C, and discharged for 36 days with a constant voltage of 4.4 V. The battery core internal impedance, open circuit voltage and battery core thickness are tested every hour. The test is stopped when the cell expansion rate is >10%, and the constant voltage charging time is recorded.

Furthermore, the rate performance test is performed on the lithium ion batteries of the examples and the comparative examples, and the specific test methods are as follows:

The temperature of incubator is set to 25° C. The battery is charged to 4.4 V with a constant current of 0.5 C and charged to 0.05 C at a constant voltage and allowed to stand for 5 minutes, and then discharged to 3 V with a constant current of 0.1 C and allowed to stand for 5 minutes. A discharge capacity of 0.1 C is a base of 100%. Subsequently, the battery is charged to 4.4V with a constant current of 0.5 C and charged to 0.05 C at a constant voltage and allowed to stand for 5 minutes, and then discharged to 3 V with a constant current of 2 C, and the discharge capacity at 2 C is recorded for performing the rate performance test. Discharge rate performance at 2 C=discharge capacity at 2 C/discharge capacity at 0.1 C*100%.

The types and contents of the additive in Comparative Examples and Examples, and the test results are shown in Tables 1-6 below.

TABLE 1

| | Fluorosulfonyl silane acetate | | trinitrile | | discharge rate performance at 2C |
|---|---|---|---|---|---|
| | type | content (wt %) | type | content (wt %) | |
| Example 1 | formula 1 | 2 | formula A | 2 | 80.6% |
| Example 2 | formula 1 | 2 | formula A | 5 | 79.8% |
| Example 3 | formula 1 | 2 | formula A | 1 | 80.4% |
| Example 4 | formula 1 | 2 | formula B | 1 | 80.2% |
| Example 5 | formula 1 | 2 | formula B | 2 | 80.4% |

TABLE 1-continued

| | Fluorosulfonyl silane acetate | | trinitrile | | discharge rate |
| --- | --- | --- | --- | --- | --- |
| | type | content (wt %) | type | content (wt %) | performance at 2C |
| Example 6 | formula 1 | 2 | formula C | 2 | 80.2% |
| Example 7 | formula 2 | 2 | formula A | 0.3 | 80.4% |
| Example 8 | formula 1 | 1 | formula A | 2 | 78.1% |
| Example 9 | formula 1 | 0.5 | formula A | 2 | 77.5% |
| Example 10 | formula 1 | 2 | formula A | 0.5 | 78.1% |
| Example 11 | formula 1 | 2 | formula A | 3 | 80.9% |
| Example 12 | formula 1 | 3 | formula A | 2 | 80.5% |
| Example 13 | formula 1 | 5 | formula A | 2 | 80.3% |
| Example 14 | formula 1 | 2 | formula A | 6 | 75.7% |
| Example 15 | formula 1 | 10 | formula A | 2 | 77.8% |
| Comparative Example 1 | formula 1 | 2 | formula A | 0 | 75.5% |
| Comparative Example 2 | formula 1 | 0 | formula A | 2 | 74.3% |

By comparing Examples 1-15 and Comparative Examples 1-2, it is known that compared with the electrolyte without trinitrile (Comparative Example 1), the electrolyte in which trinitrile is added as an additive may improve the rate performance of the lithium ion battery. Compared with the electrolyte without fluorosulfonyl silane acetate (Comparative Example 2), the electrolyte in which fluorosulfonyl silane acetate is added as an additive may improve the rate performance of the lithium ion battery, and the rate performance of the lithium ion battery is lowered when the contents of fluorosulfonyl silane acetate and trinitrile are too high or too low. Fluorosulfonyl silane acetate is an excellent film forming additive. When the content of the fluorosulfonyl silane acetate is too low, it is difficult to form completely a stable SEI on the surface of the negative electrode, and the electrode material and the electrolyte are not completely protected, so that the performance of lithium-ion battery is deteriorated. When the content of the fluorosulfonyl silane acetate is too high, especially under high temperature conditions, the gas production of the electrode assembly where the compound is located is severe, resulting in a decrease in the rate performance.

The nitrile compound has a lone pair of electrons, which may be combined with the positive electrode cation empty orbit to stabilize the positive electrode interface. When the content of the nitrile compound is too low, the surface of the positive electrode may not be completely covered, and in the case of large rate discharge, the structure of the positive electrode may be easily destroyed; when the content of the nitrile compound is too high, the viscosity of the electrolyte is increased to deteriorate the kinetic performance. For example, by comparing Examples 1-2 and 14, it is known that when the content of trinitrile exceeds 5%, the rate performance of the lithium ion battery is affected.

The fluorosulfonyl silane acetate used in combination with a nitrile compound may on the one hand form a film on the positive and negative electrodes to protect the electrode interface and reduce the generation of by-products and gases of the electrode assembly. On the other hand, the nitrile compound has a lone pair of electrons, which may be combined with free hydrogen ions in the electrolyte to reduce the gas production effect caused by the high concentration of fluorosulfonyl silane acetate.

TABLE 2

| | Fluorosulfonyl silane acetate | | trinitrile | | dinitrile | | floating charge | discharge rate |
| --- | --- | --- | --- | --- | --- | --- | --- | --- |
| | Type | content (wt %) | type | content (wt %) | type | content (wt %) | rate at 45° C. <10, time (h) | performance at 2 C |
| Example 1 | formula 1 | 2 | formula A | 2 | | | 776 | 80.6% |
| Example 16 | formula 1 | 2 | formula A | 1.5 | formula D | 0.5 | 801 | 81.8% |
| Example 17 | formula 1 | 2 | formula A | 1 | formula D | 1 | 807 | 81.9% |
| Example 18 | formula 1 | 2 | formula A | 2 | formula D | 0.5 | 810 | 82.0% |
| Example 19 | formula 1 | 2 | formula A | 1.5 | formula E | 0.5 | 798 | 80.8% |
| Example 20 | formula 1 | 2 | formula A | 1 | formula E | 1 | 799 | 81.2% |
| Example 21 | formula 1 | 2 | formula A | 2 | formula E | 0.5 | 808 | 81.4% |
| Example 22 | formula 1 | 2 | formula A | 2 | formula D + formula E | 0.5 + 0.5 | 809 | 81.1% |
| Example 23 | formula 1 | 2 | formula A | 2 | formula D | 2 | 808 | 82.2% |
| Example 24 | formula 1 | 2 | formula A | 2 | formula D | 3 | 807 | 81.4% |
| Example 25 | formula 1 | 2 | formula A | 2 | formula D | 5 | 794 | 80.9% |
| Example 26 | formula 1 | 2 | formula A | 2 | formula D | 8 | 774 | 80.7% |
| Comparative Example 3 | formula 1 | 2 | formula A | 0 | formula D | 0.5 | 602 | 76.3% |
| Comparative Example 4 | formula 1 | 2 | formula A | 0 | formula D | 0.01 | 540 | 68.8% |

By comparing Comparative Examples 3-4, Examples 1 and 16-26, it is known that the combination of fluorosulfonyl silane acetate and trinitrile and dinitrile may improve the floating charge and rate performance of a lithium ion battery.

The nitrile compound is a structure acting on the positive electrode with lone pair electrons on the —CN group that may be combined with the positive electrode active material to effectively stabilize the positive electrode. The stability of the trinitrile to the positive electrode cation is excellent. However, the viscosity of trinitrile is relatively large, and the combination of trinitrile and dinitrile may reduce the viscosity of the electrolyte, and may solve the problem that the performance of the battery may not be greatly improved by using a single structure of a nitrile compound to make the film forming component relatively simple. The combination of different nitrile compounds may on the one hand compensate for the kinetic defects of using a large amount of single nitrile compound, and on the other hand, the combined use may better exert the characteristics of the additive to improve the floatating charge and rate performance of the battery core.

TABLE 3

| | Fluorosulfonyl silane acetate | | trinitrile | | cyclic ether | | cycle life at 25° C. (number of cycle) | cycle life at 45° C. (number of cycle) | discharge rate performance at 2 C |
|---|---|---|---|---|---|---|---|---|---|
| | type | content (wt %) | type | content (wt %) | type | content (wt %) | | | |
| Example 27 | formula 1 | 2 | formula A | 2 | formula A | 1 | 952 | 754 | 84.6% |
| Example 28 | formula 1 | 2 | formula A | 2 | formula b | 1 | 948 | 747 | 84.3% |
| Example 29 | formula 1 | 2 | formula A | 2 | formula A | 0.5 | 935 | 732 | 84.1% |
| Example 30 | formula 1 | 2 | formula A | 2 | formula A | 2 | 942 | 743 | 83.4% |
| Example 31 | formula 1 | 2 | formula A | 2 | formula A | 5 | 929 | 728 | 82.8% |
| Example 32 | formula 1 | 2 | formula A | 2 | formula b | 0.5 | 933 | 731 | 83.9% |
| Example 33 | formula 1 | 2 | formula A | 2 | formula b | 2 | 939 | 739 | 83.1% |
| Example 34 | formula 1 | 2 | formula A | 2 | formula b | 5 | 928 | 729 | 82.5% |
| Example 35 | formula 1 | 2 | formula A | 2 | formula b | 6 | 891 | 709 | 80.7% |
| Example 36 | formula 1 | 2 | formula A | 2 | formula A | 10 | 847 | 649 | 77.1% |
| Example 1 | formula 1 | 2 | formula A | 2 | | | 867 | 668 | 80.6% |

By comparing Examples 1 and 27-36, it is known that the cycle and rate performance of the lithium ion battery may be improved when the cyclic ether is added. The dioxane may react on the surface of the positive electrode during the charging process to form a solid electrolyte membrane, which makes the positive electrode interface more stable, thereby improving the rate and cycle performance of the battery core. In addition, the dioxane may also undergo a reduction reaction on the surface of the negative electrode to form SEI, which stabilizes the negative electrode interface. When the content of dioxane is too high, the impedance of the solid electrolyte membrane formed at the interface between the positive and negative electrodes is too large, which is disadvantageous for the improvement of the rate performance. If the content of dioxane is too low, a complete SEI may not be formed at the interface between the positive and negative electrodes, which is not conducive to the improvement of cycle performance.

TABLE 4

| | Fluorosulfonyl silane acetate | | trinitrile | | fluoroether | | cycle life at 25° C. (number of cycle) | cycle life at 45° C. (number of cycle) | discharge rate performance at 2 C |
|---|---|---|---|---|---|---|---|---|---|
| | type | content (wt %) | type | content (wt %) | type | content (wt %) | | | |
| Example 37 | formula 1 | 2 | formula A | 2 | formula x | 5 | 920 | 723 | 87.8% |
| Example 38 | formula 1 | 2 | formula A | 2 | formula y | 5 | 917 | 718 | 87.4% |
| Example 39 | formula 1 | 2 | formula A | 2 | formula x | 1 | 907 | 708 | 86.1% |
| Example 40 | formula 1 | 2 | formula A | 2 | formula x | 2 | 913 | 714 | 87.1% |
| Example 41 | formula 1 | 2 | formula A | 2 | formula x | 2.5 | 923 | 725 | 87.8% |
| Example 42 | formula 1 | 2 | formula A | 2 | formula x | 3 | 918 | 717 | 87.5% |
| Example 43 | formula 1 | 2 | formula A | 2 | formula x | 7 | 908 | 710 | 86.7% |
| Example 44 | formula 1 | 2 | formula A | 2 | formula x | 10 | 903 | 704 | 86.4% |
| Example 45 | formula 1 | 2 | formula A | 2 | formula y | 1 | 905 | 706 | 85.8% |
| Example 46 | formula 1 | 2 | formula A | 2 | formula y | 2 | 911 | 711 | 86.9% |
| Example 47 | formula 2 | 2 | formula A | 2 | formula y | 2 | 912 | 711 | 86.7% |
| Example 48 | formula 1 | 2 | formula A | 2 | formula x | 11 | 860 | 662 | 76.4% |
| Example 1 | formula 1 | 2 | formula A | 2 | | | 867 | 668 | 80.6% |

By comparing Examples 1 and 37-48, it is known that the combination of fluorosulfonyl silane acetate and fluoroether may effectively improve the cycle and rate performance of a lithium ion battery. The addition of a fluoroether to the electrolyte produces a synergistic effect with the fluorosulfonyl silane acetate and trinitrile for improving the cycle life at 25° C., the cycle life at 45° C. and the floating charge performance of the battery. When the content of the fluoroether is too high, the boiling point of the electrolyte is lowered.

fluorine atom of the —SO$_2$F functional group is easily reacted to form a film at the negative electrode, so that a low-impedance SEI may be formed at the negative electrode.

On the surface of the negative electrode, fluorosulfonyl silane acetate may form a low-impedance, chemically stable SEI, which may repair the fresh interface exposed by the expansion and breakage of silicon particles in time; the cyclic ether may form a flexible SEI on the surface of the negative electrode, which may inhibit the phenomenon of particle pulverization caused by expansion and contraction of the silicon particles to a certain extent for maintaining the conduction of electrons on the negative electrode. On the surface of the positive electrode, the nitrile compound may be complexed with the positive electrode cation to stabilize the positive electrode interface by stabilizing the metal cation; the cyclic ether reacts on the surface of the positive electrode to form a film, which further improves the stability of the positive electrode interface and improves the floating charge performance of the battery. By adding the above additives, the conductivity of the electrolyte is increased, the wettability and oxidation resistance of the electrolyte are improved, the ion conductivity and interfacial transfer efficiency of the electrolyte are improved, the problem of excessive viscosity of the electrolyte and excessive surface tension caused by additives such as nitrile compounds is eliminated, the stable and efficient transmission of ions and electrons in the lithium ion battery is ensured, and the cycle, rate and float charge performance of the lithium ion battery is improved.

TABLE 5

| | Fluorosulfonyl silane acetate | | trinitrile | | dinitrile | | cyclic ether | | fluoroether | | cycle life at 25° C. (number of cycle) | cycle life at 45° C. (number of cycle) | floating charge rate at 45° C. <10, time (h) | discharge rate performance at 2 C |
|---|---|---|---|---|---|---|---|---|---|---|---|---|---|---|
| | Type | content (wt %) | Type | content (wt %) | Type | content (wt %) | Type | content (wt %) | Type | content (wt %) | | | | |
| Example 49 | formula 1 | 2 | formula A | 2 | formula D | 0.5 | formula A | 1 | | | 968 | 769 | 960 | 89.7% |
| Example 50 | formula 1 | 2 | formula A | 2 | formula D | 0.5 | | | formula x | 3 | 955 | 753 | 943 | 88.2% |
| Example 51 | formula 1 | 2 | formula A | 2 | | | formula A | 1 | formula x | 3 | 963 | 761 | 951 | 88.6% |
| Example 52 | formula 1 | 2 | formula A | 2 | formula D | 0.5 | formula A | 1 | formula x | 3 | 972 | 770 | 976 | 90.8% |
| Example 53 | formula 2 | 2 | formula A | 2 | formula D | 0.5 | formula A | 1 | | | 959 | 764 | 962 | 89.8% |
| Example 1 | formula 1 | 2 | formula A | 2 | | | | | | | 867 | 665 | 776 | 80.6% |

By comparing Examples 1 and 49-53, it is known that the combination of fluorosulfonyl silane acetate, trinitrile compound, dinitrile compound, cyclic ether and fluoroether may improve the cycle, floating charge and rate performance of a lithium ion battery.

The synergistic effect of fluorosulfonyl silane acetate, trinitrile compound, dinitrile compound, cyclic ether and fluoroether forms a diversified solid electrolyte membrane on the positive and negative electrodes of the battery, which stabilizes the interface structure and may improve the stability and oxidation resistance of the electrolyte. Through the above properties, the rate, floating charge and cycle performance of the lithium ion battery are finally improved.

During the charging process, the electrons on the surface of the negative electrode are reduced with fluorosulfonyl silane acetate to form a stable SEI, which inhibits the fracture of the material caused by the expansion and contraction of the silicon negative electrode during charging and discharging. The compound containing an —O—Si-functional group may form a stable protective film on the surface of the silicon negative material; at the same time, the

TABLE 6

| | Fluorosulfonyl silane acetate | | trinitrile | | dinitrile | | cyclic ether | |
|---|---|---|---|---|---|---|---|---|
| | Type | content (wt %) | Type | content (wt %) | Type | content (wt %) | Type | content (wt %) |
| Example 54 | formula 1 | 2 | formula A | 2 | | | | |
| Example 55 | formula 1 | 2 | formula A | 2 | formula D | 0.5 | | |
| Example 56 | formula 1 | 2 | formula A | 2 | | | formula A | 1 |
| Example 57 | formula 1 | 2 | formula A | 2 | | | | |
| Example 58 | formula 1 | 2 | formula A | 2 | formula D | 0.5 | formula A | 1 |
| Example 59 | formula 1 | 2 | formula A | 2 | formula D | 0.5 | | |
| Example 60 | formula 1 | 2 | formula A | 2 | | | formula A | 1 |
| Example 61 | formula 1 | 2 | formula A | 2 | formula D | 0.5 | formula A | 1 |
| Example 62 | formula 2 | 2 | formula A | 2 | formula D | 0.5 | formula A | 1 |
| Comparative Example 5 | formula 1 | 2 | | | | | | |
| Comparative Example 6 | | | formula A | 2 | | | | |

| | fluoroether | | cycle life at 25° C. (number of cycle) | cycle life at 45° C. (number of cycle) | floating charge rate at 45° C. <10, time (h) | discharge rate performance at 2 C |
|---|---|---|---|---|---|---|
| | Type | content (wt %) | | | | |
| Example 54 | | | 1069 | 860 | 780 | 85.9% |
| Example 55 | | | 1080 | 890 | 805 | 87.1% |
| Example 56 | | | 1155 | 940 | 860 | 88.6% |
| Example 57 | formula x | 3 | 1140 | 932 | 830 | 87.8% |
| Example 58 | | | 1170 | 967 | 968 | 91.7% |
| Example 59 | formula x | 3 | 1165 | 963 | 950 | 90.3% |
| Example 60 | formula x | 3 | 1172 | 972 | 960 | 90.6% |
| Example 61 | formula x | 3 | 1201 | 980 | 983 | 92.8% |
| Example 62 | formula x | 3 | 1201 | 980 | 983 | 92.8% |
| Comparative Example 5 | | | 856 | 677 | 735 | 80.1% |
| Comparative Example 6 | | | 851 | 665 | 742 | 80.8% |

By comparing Examples 54-61 and Comparative Examples 5-6, it is known that in the graphite system, the fluorosulfonyl silane acetate and the trinitrile compound may effectively improve the cycle, rate and floating charge performance of the battery.

Those skilled in the art will appreciate that the above-described examples are merely exemplary embodiments and are not to be construed as limiting the present application, and various changes, substitutions and changes may be made without departing from the spirit and scope of the present application.

What is claimed is:

1. An electrolyte, comprising:
    a trinitrile compound;
    a dinitrile compound;
    a fluorosulfonyl silane acetate; and
    a cyclic ether;
    wherein,
    the trinitrile compound is of general formula (I),

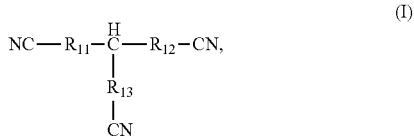

wherein $R_{11}$, $R_{12}$, and $R_{13}$ are each independently selected from alkylene groups having 0 to 8 carbon atoms, and $R_{11}$, $R_{12}$, and $R_{13}$ are not 0 simultaneously;

the dinitrile compound includes at least general formula (IV),

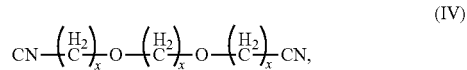
(IV)

wherein x is a positive integer from 1 to 8;

the cyclic ether has a general formula of at least one of

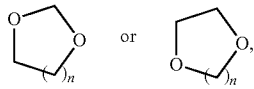

wherein n is an integer from 1 to 5, wherein an amount of the cyclic ether in the electrolyte is from 0.1 wt % to 10 wt %;

and wherein the fluorosulfonyl silane acetate forms a stable solid electrolyte interface on a surface of a negative electrode.

2. The electrolyte according to claim 1, wherein the trinitrile compound is selected from one or more of 1,3,6-hexanetrizonitrile, 1,2,6-hexanetricarbonitrile, 1,3,5-pentatrionitrile, or 1,2,3-propanetricarbonitrile.

3. The electrolyte according to claim 1, wherein the fluorosulfonyl silane acetate is selected from one or more of fluoromethyl trimethylsilyl difluoro(fluorosulfonyl) acetate, and difluoromethyl trimethylsilyl difluoro(fluorosulfonyl) acetate.

4. The electrolyte according to claim 1, wherein the content of the fluorosulfonyl silane acetate is 0.1 wt % to 10 wt %.

5. The electrolyte according to claim 1, wherein the dinitrile compound is ethylene glycol bis(propionitrile) ether.

6. The electrolyte according to claim 1, further comprising a fluoroether, wherein the fluoroether is at least one of general formula (V),

(V)

in general formula (V), $R_{31}$ and $R_{32}$ are each independently selected from one of fluoroalkyl groups having 1 to 5 carbon atoms.

7. The electrolyte according to claim 6, wherein the fluoroether is selected from one or more of 1,1,2,2-tetrafluoroethyl-1,1,2,2-tetrafluoropropyl ether, 1,1,2,2-tetrafluoroethyl-1,1,1-trifluoroethyl ether, 1,1,2,2-tetrafluoroethyl-2,2,3,3-tetrafluoropropyl ether, fluoromethyl-1,1,1,3,3,3-hexafluoroisopropyl ether, 1,1,2,2-tetrafluoroethyl ethyl ether, 1,2-bis(1,1,2,2-tetrafluoroethoxy)ethane, 1,2,2,2-tetrafluoroethyldifluoromethyl ether.

8. The electrolyte according to claim 6, wherein the content of the fluoroether is 0.1 wt % to 10 wt %, based on the total weight of the electrolyte.

9. The electrolyte according to claim 1, wherein the cyclic ether is selected from one or more of 1,3-dioxane, 1,4-dioxane, and 1,3-dioxolane.

10. A lithium ion battery, comprising a positive electrode, a negative electrode, a separator, and an electrolyte, wherein the electrolyte comprises:

a trinitrile compound;
a dinitrile compound;
a fluorosulfonyl silane acetate; and
a cyclic ether;

wherein, the trinitrile compound is of general formula (I),

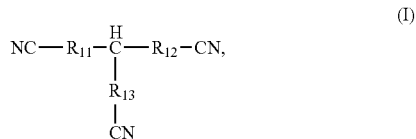
(I)

wherein $R_{11}$, $R_{12}$, and $R_{13}$ are each independently selected from alkylene groups having 0 to 8 carbon atoms, and $R_{11}$, $R_{12}$, and $R_{13}$ are not 0 simultaneously;

the dinitrile compound includes at least general formula (IV),

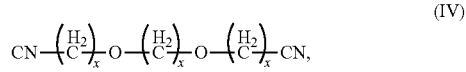
(IV)

wherein x is a positive integer from 1 to 8;

the cyclic ether has a general formula of at least one of

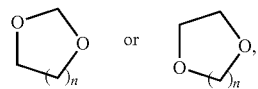

wherein n is an integer from 1 to 5, wherein an amount of the cyclic ether in the electrolyte is from 0.1 wt % to 10 wt % and wherein the fluorosulfonyl silane acetate forms a stable solid electrolyte interface on a surface of the negative electrode.

11. The lithium ion battery according to claim 10, wherein the negative electrode includes one or more of natural graphite, artificial graphite, amorphous carbon material and silicon material.

12. The lithium ion battery according to claim 11, wherein the silicon material includes one or more of a silicon oxide compound, a silicon carbon compound, a silicon nitride compound, and a silicon alloy.

13. The lithium ion battery according to claim 10, wherein the trinitrile compound is selected from one or more of 1,3,6-hexanetrizonitrile, 1,2,6-hexanetricarbonitrile, 1,3,5-pentatrionitrile, 1,2,3-propanetricarbonitrile.

14. The lithium ion battery according to claim 10, further comprising fluoroether, wherein the fluoroether is at least one of general formula (V),

(V)

in general formula (V), $R_{31}$ and $R_{32}$ are each independently selected from one of fluoroalkyl groups having 1 to 5 carbon atoms.

15. The lithium ion battery according to claim 10, wherein the negative electrode comprises a negative electrode active material, and a mass ratio of silicon to carbon in the negative electrode active material is 1:9 to 5:5, a median diameter D50 is 10 μm to 50 μm, and the specific surface area is 3 m²/g to 10 m²/g.

16. The lithium ion battery according to claim 10, wherein the fluorosulfonyl silane acetate is a compound of general formula (II):

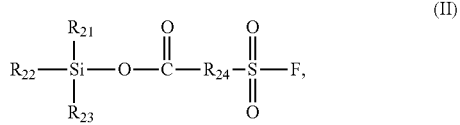

(II)

wherein $R_{21}$, $R_{22}$, $R_{23}$ and $R_{24}$ are independently an alkyl group having 1 to 10 carbon atoms, a fluoroalkyl group having 1 to 10 carbon atoms, an alkoxy group having 1 to 10 carbon atoms or a fluoroalkoxy group having 1 to 10 carbon atoms.

17. The electrolyte according to claim 1, wherein the fluorosulfonyl silane acetate is a compound of general formula (II):

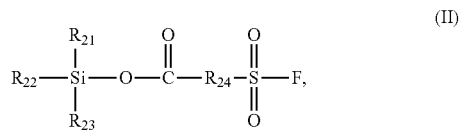

(II)

wherein $R_{21}$, $R_{22}$, $R_{23}$ and $R_{24}$ are independently an alkyl group having 1 to 10 carbon atoms, a fluoroalkyl group having 1 to 10 carbon atoms, an alkoxy group having 1 to 10 carbon atoms or a fluoroalkoxy group having 1 to 10 carbon atoms.

* * * * *